US012586965B2

(12) United States Patent
Liao

(10) Patent No.: US 12,586,965 B2
(45) Date of Patent: Mar. 24, 2026

(54) CABLE CONNECTOR

(71) Applicant: BELLWETHER ELECTRONIC CORP., Taoyuan City (TW)

(72) Inventor: Yen-Jang Liao, Taoyuan City (TW)

(73) Assignee: BELLWETHER ELECTRONIC CORP., Taoyuan City (TW)

( * ) Notice: Subject to any disclaimer, the term of this patent is extended or adjusted under 35 U.S.C. 154(b) by 363 days.

(21) Appl. No.: 18/511,959

(22) Filed: Nov. 16, 2023

(65) Prior Publication Data

US 2024/0396273 A1 Nov. 28, 2024

Related U.S. Application Data

(60) Provisional application No. 63/469,035, filed on May 25, 2023.

(51) Int. Cl.

| | |
|---|---|
| ***H01R 24/52*** | (2011.01) |
| ***H01R 9/05*** | (2006.01) |
| ***H01R 13/24*** | (2006.01) |
| ***H01R 13/502*** | (2006.01) |

(52) U.S. Cl.

CPC ............... *H01R 24/52* (2013.01); *H01R 9/05* (2013.01); *H01R 13/2457* (2013.01); *H01R 13/502* (2013.01)

(58) Field of Classification Search

CPC ...... H01R 24/52; H01R 9/05; H01R 13/2457; H01R 13/502; H01R 13/5216; H01R 13/5845; H01R 13/5812; H01R 13/112; H01R 13/6272; H01R 2107/00; H01R 13/40

See application file for complete search history.

(56) References Cited

U.S. PATENT DOCUMENTS

| | | | | |
|---|---|---|---|---|
| 6,106,340 | A * | 8/2000 | Myer | H01R 13/4367 439/752 |
| 8,021,199 | B2 * | 9/2011 | Ambo | H01R 13/502 439/752 |
| 11,005,210 | B2 * | 5/2021 | Tian | H01R 13/4367 |
| 11,990,703 | B2 * | 5/2024 | Chen | H01R 13/5045 |
| 2019/0319399 | A1 * | 10/2019 | Zheng | H01R 13/428 |
| 2023/0006387 | A1 * | 1/2023 | Liao | H01R 4/48 |
| 2024/0396273 | A1 * | 11/2024 | Liao | H01R 13/502 |
| 2025/0070506 | A1 * | 2/2025 | Sung | H01R 13/6272 |
| 2025/0329963 | A1 * | 10/2025 | Chi | H01R 13/6272 |

FOREIGN PATENT DOCUMENTS

| | | |
|---|---|---|
| TW | M450113 U1 | 4/2013 |
| TW | M633994 U * | 11/2022 |

* cited by examiner

*Primary Examiner* — Abdullah A Riyami

*Assistant Examiner* — Nader J Alhawamdeh

(74) *Attorney, Agent, or Firm* — Li & Cai Intellectual Property Office

(57) ABSTRACT

A cable connector includes an insulating body, a first cable assembly, a second cable assembly, and a first stop structure. A portion of the first cable assembly and the second cable assembly are correspondingly disposed in a first terminal slot and a second terminal slot of the insulating body. The first stop structure is made of a curable substance and is located in the insulating body to limit a range of movement of the second cable assembly in the second terminal slot.

21 Claims, 11 Drawing Sheets

CABLE CONNECTOR

CROSS-REFERENCE TO RELATED PATENT APPLICATION

This application claims the benefit of priority to the U.S. Provisional Patent Application Ser. No. 63/469,035 filed on May 25, 2023, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a connector, and more particularly to a cable connector.

BACKGROUND OF THE DISCLOSURE

In actual use of a conventional cable connector, at least one connection cable can be easily affected by an external force, which can cause the at least one connection cable or a corresponding terminal to be detached from the insulating body of the conventional cable connector, or the corresponding terminal to shift with respect to the insulating body. In the event of such occurrences, the connection effect provided by the conventional cable connector is negatively impacted.

SUMMARY OF THE DISCLOSURE

In response to the above-referenced technical inadequacies, the present disclosure provides a cable connector for effectively improving on the issues associated with conventional cable connector. Specifically, when the conventional cable connector in operation is affected by an external force that is applied on connection cables thereof, at least one terminal may be moved relative to an insulating body to affect a connection effect of the cable connector, or the at least one terminal and the connection cables may be detached from the insulating body.

In one aspect, the present disclosure provides a cable connector, which includes an insulating body, at least one first cable assembly, at least one second cable assembly, and a first stop structure. The insulating body includes at least one first terminal slot and a plurality of second terminal slots. One end of the second terminal slots jointly defines an accommodating space. The at least one first cable assembly has a first conductive component and a first connection cable. The first conductive component is electrically connected to the first connection cable, and the first conductive component is fixed to the at least one first terminal slot. The at least one second cable assembly has a second conductive component and a second connection cable. The second conductive component is electrically connected to the second connection cable, and the second conductive component is fixed to one of the second terminal slots. A part of the second connection cable is arranged in the accommodating space. The at least one second cable assembly is different from the first cable assembly. The first stop structure is made of a curable substance and is fixed in the accommodating space to limit a movable range of the second cable assembly in a corresponding one of the second terminal slots.

In another aspect, the present disclosure provides a cable connector, which includes an insulating body, at least one first cable assembly, at least one second cable assembly, and a second stop structure. The insulating body includes at least one first terminal slot, at least one second terminal slot, and at least one first engaging structure. Two ends of the at least one first terminal slot include a first connection opening and a first insertion opening, respectively. Two ends of the at least one second terminal slot include a second connection opening and a second insertion opening, respectively. The at least one first engaging structure is arranged adjacent to the at least one second terminal slot. The at least one first cable assembly includes a first conductive component and a first connection cable. The first conductive component is electrically connected to the first connection cable, the first conductive component is fixed in the at least one first terminal slot and is arranged adjacent to the first connection opening, and a part of the first connection cable is arranged in the at least one first terminal slot. The at least one second cable assembly includes a second conductive component and a second connection cable. The second conductive component is electrically connected to the second connection cable, and the second conductive component is fixed in the at least one second terminal slot and is arranged adjacent to the second connection opening. A part of the second connection cable is arranged in the at least one second terminal slot, and the second conductive component is different from the first conductive component. The second stop structure is an insulating structure. The second stop structure includes a second engaging structure, and the second engaging structure is configured to be engaged with the first engaging structure, so that the second stop structure is fixed and arranged adjacent to the second insertion opening.

Therefore, the cable connector in the present disclosure can be provided to effectively limit the movable range of the second cable assembly (and/or the first cable assembly) in the insulating body through the stop structure, thereby effectively reducing issues relating to the second cable assembly (and/or the first cable assembly) being easily detached from the insulating body when being applied with the external force.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
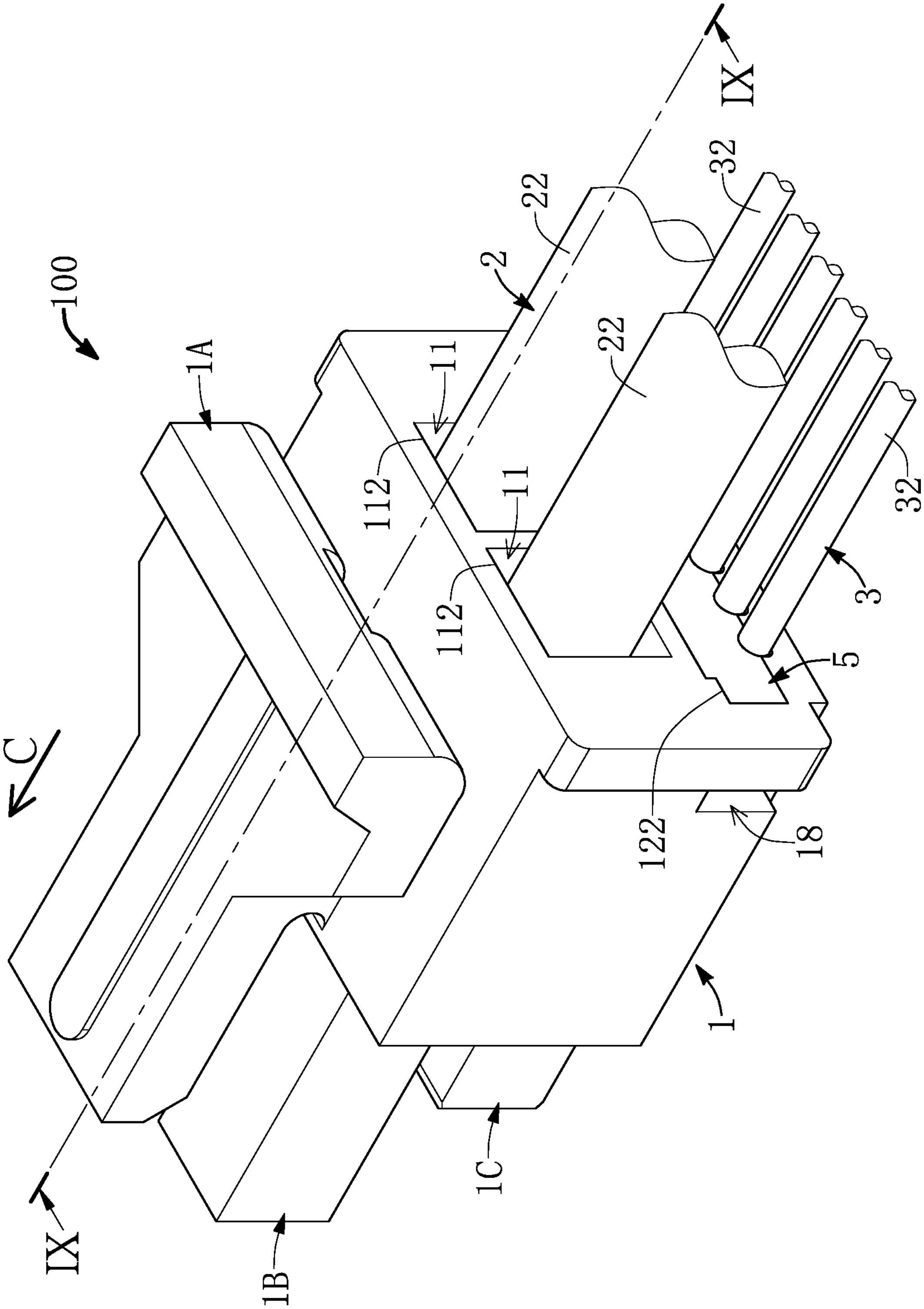
FIG. 1 and FIG. 2 are schematic views of a cable connector from different angles of view according to a first embodiment of the present disclosure.
Figure 2:
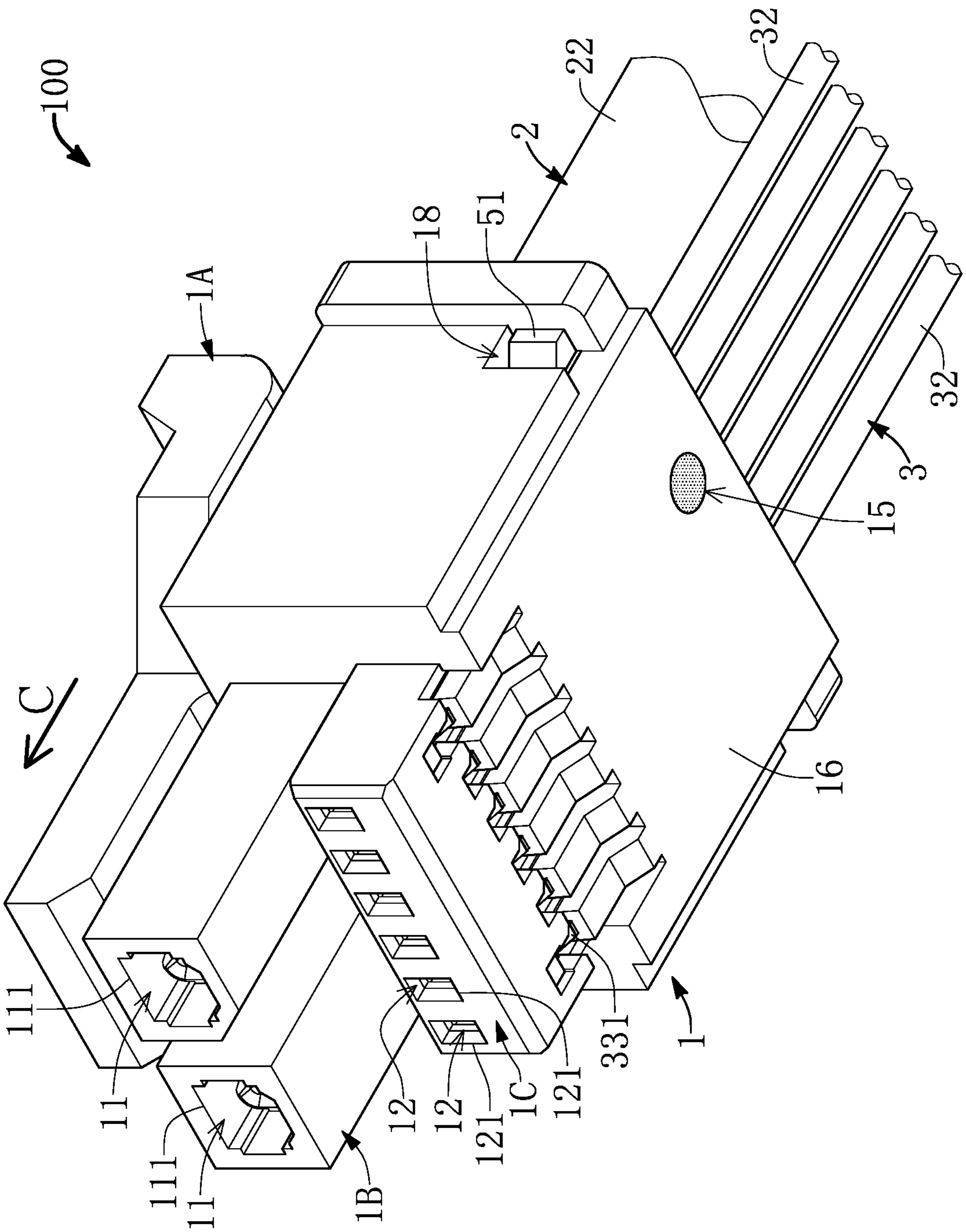

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 3:
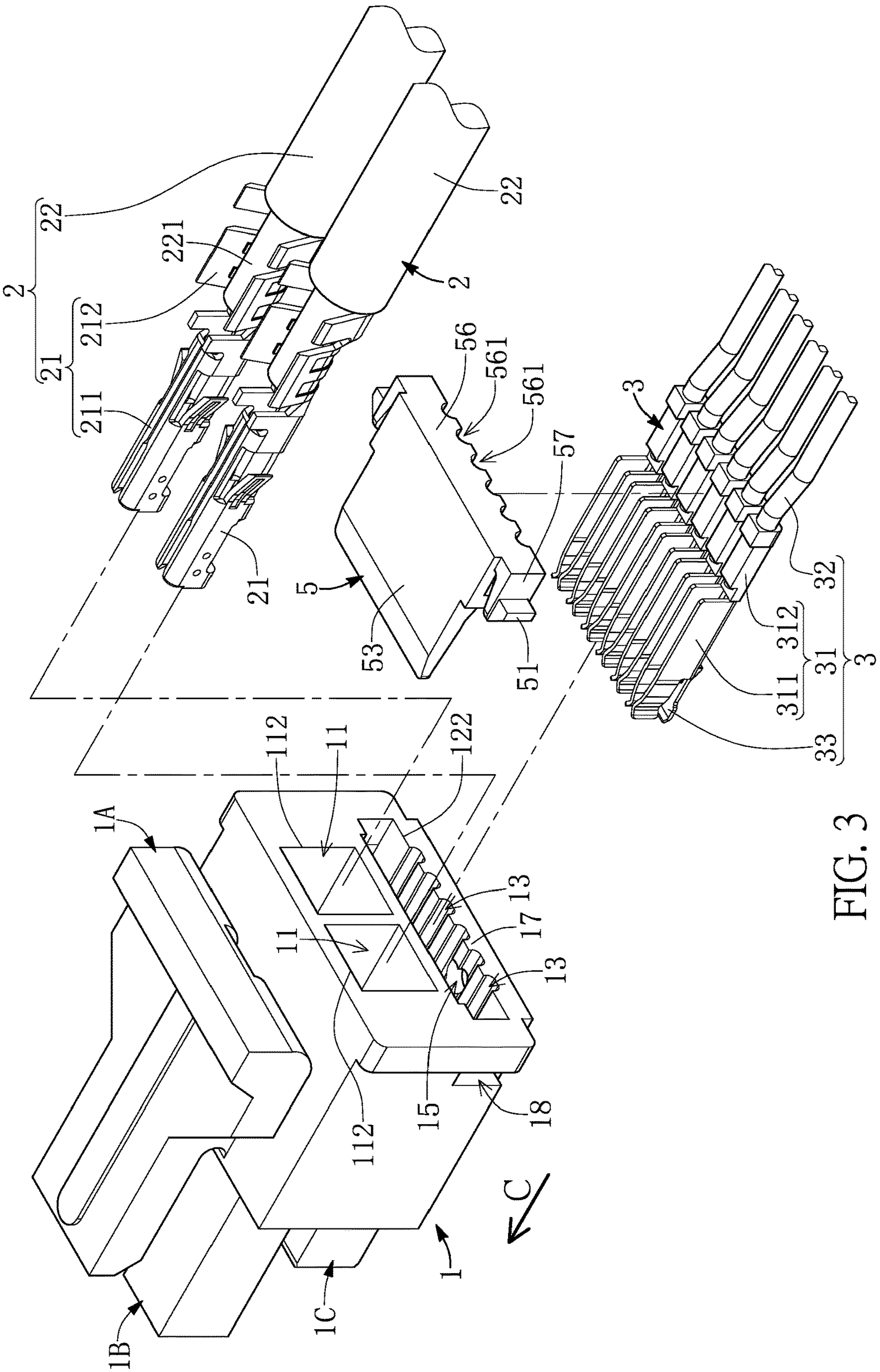
FIG. 3 is a partial schematic exploded view of the cable connector.
Figure 4:
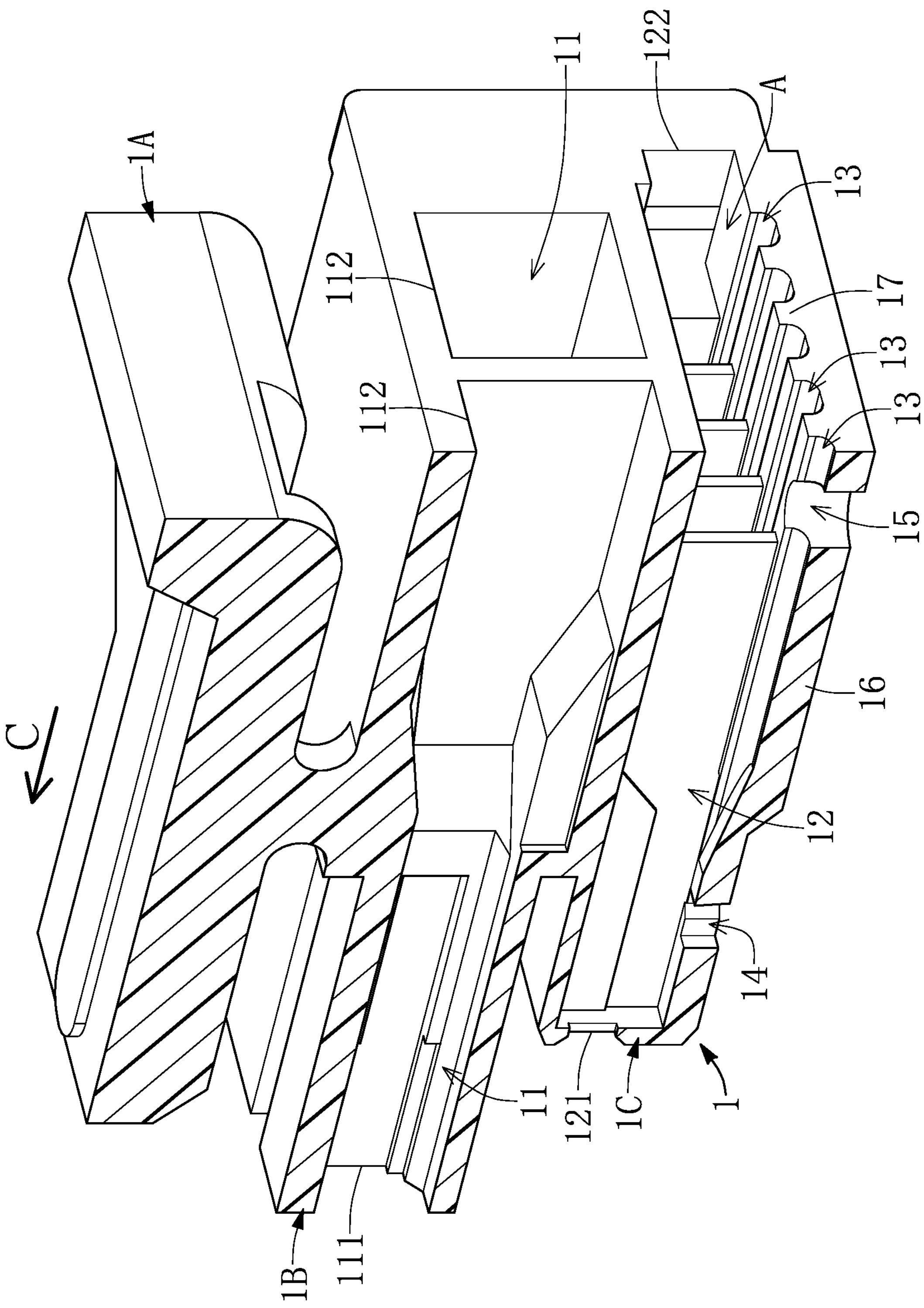
FIG. 4 is a schematic cross-sectional view of an insulating body of the cable connector.
Figure 5:
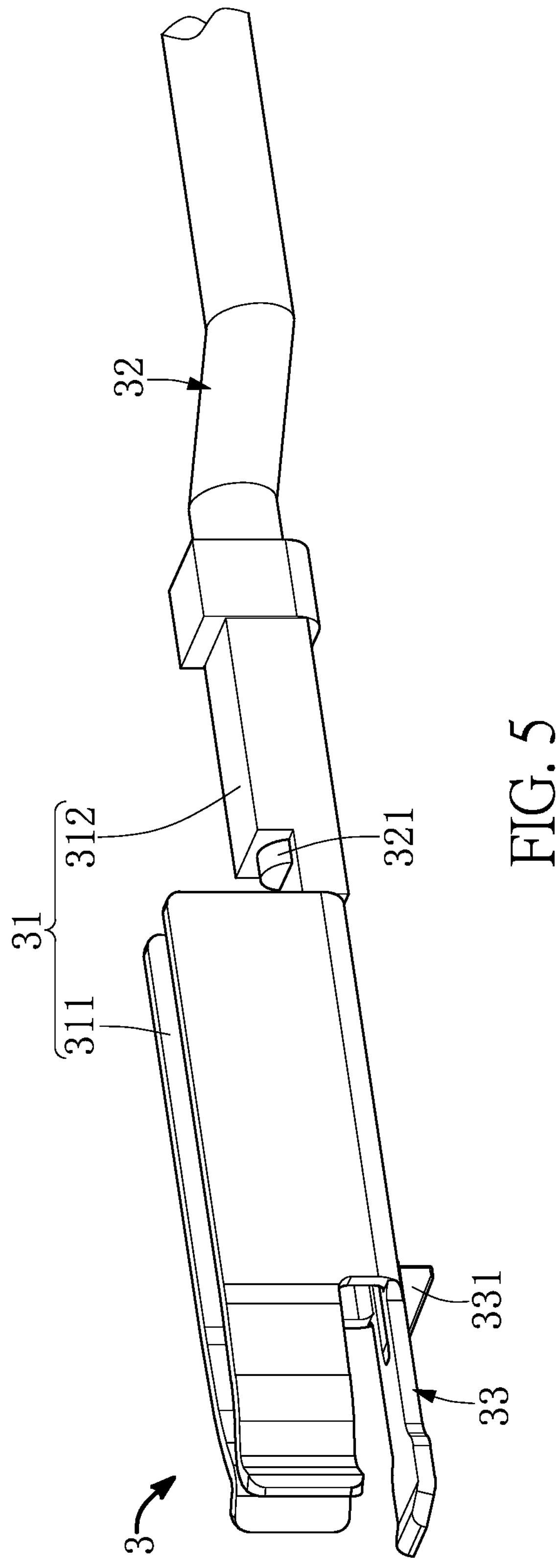
FIG. 5 is a schematic view of a second cable assembly of the cable connector.
Figure 6:
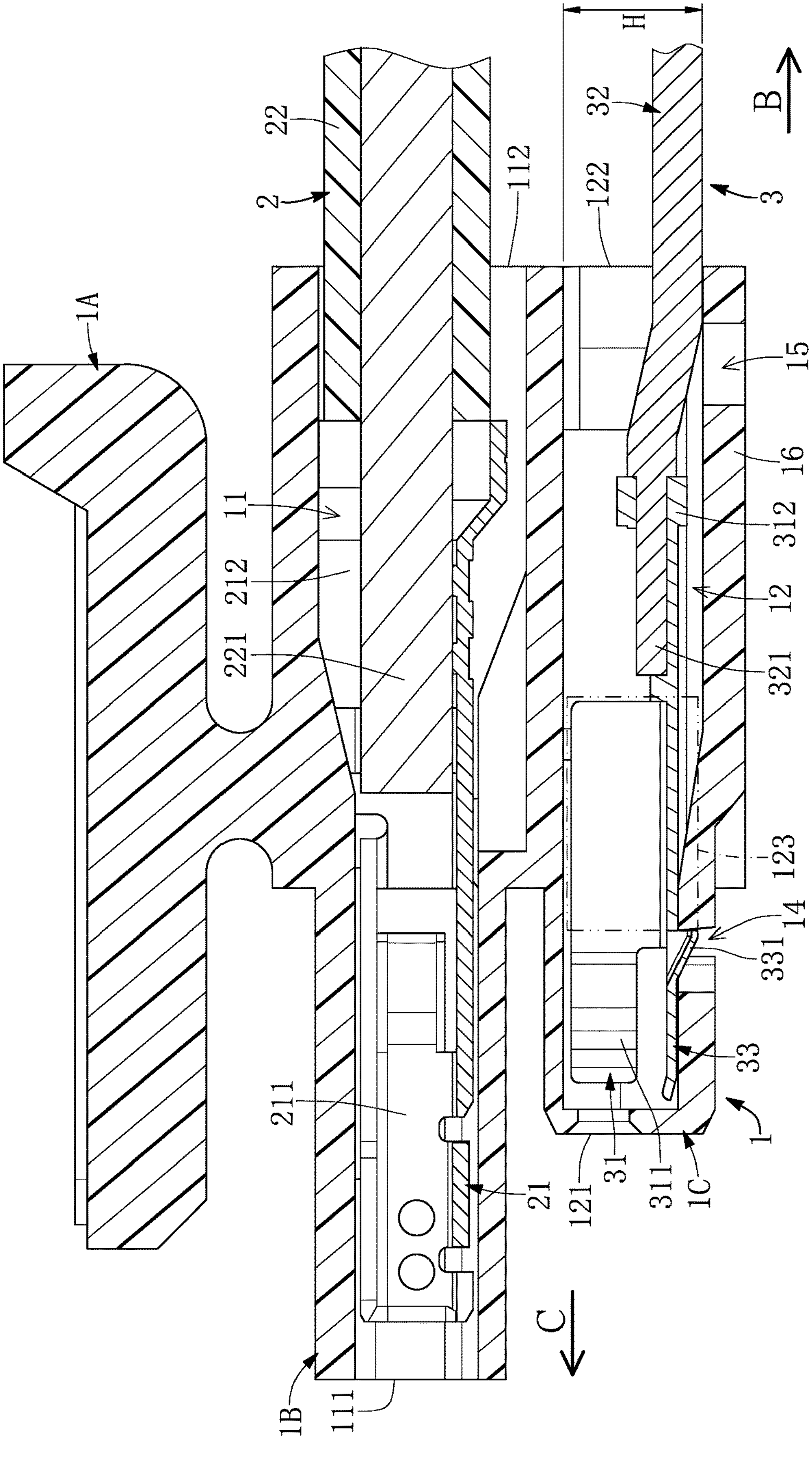
FIG. 6 is a schematic cross-sectional view showing the insulating body of the cable connector assembled with a first cable assembly and the second cable.
Figure 7:
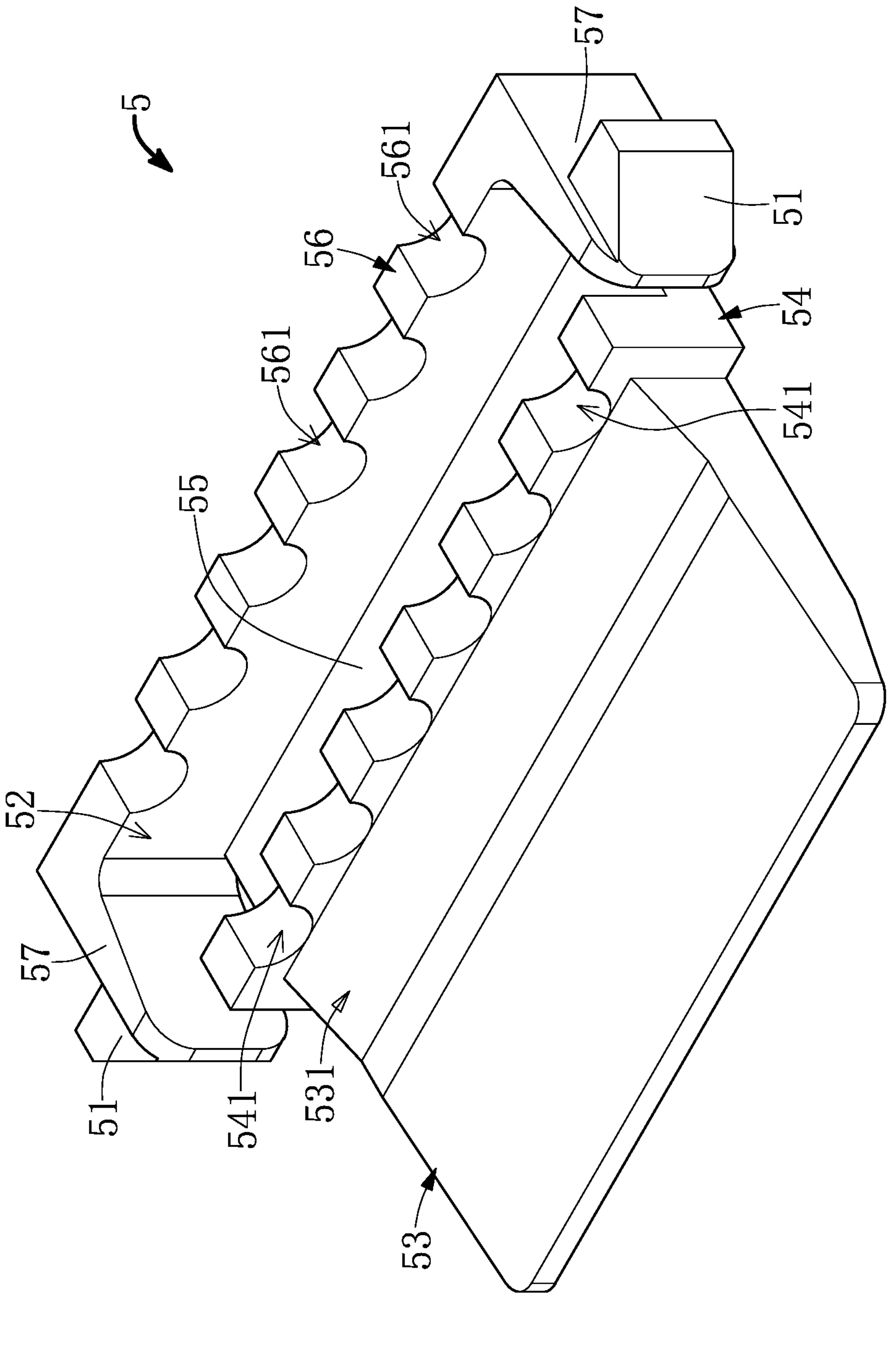
FIG. 7 is a schematic view of a second stop structure of the cable connector.
Figure 8:
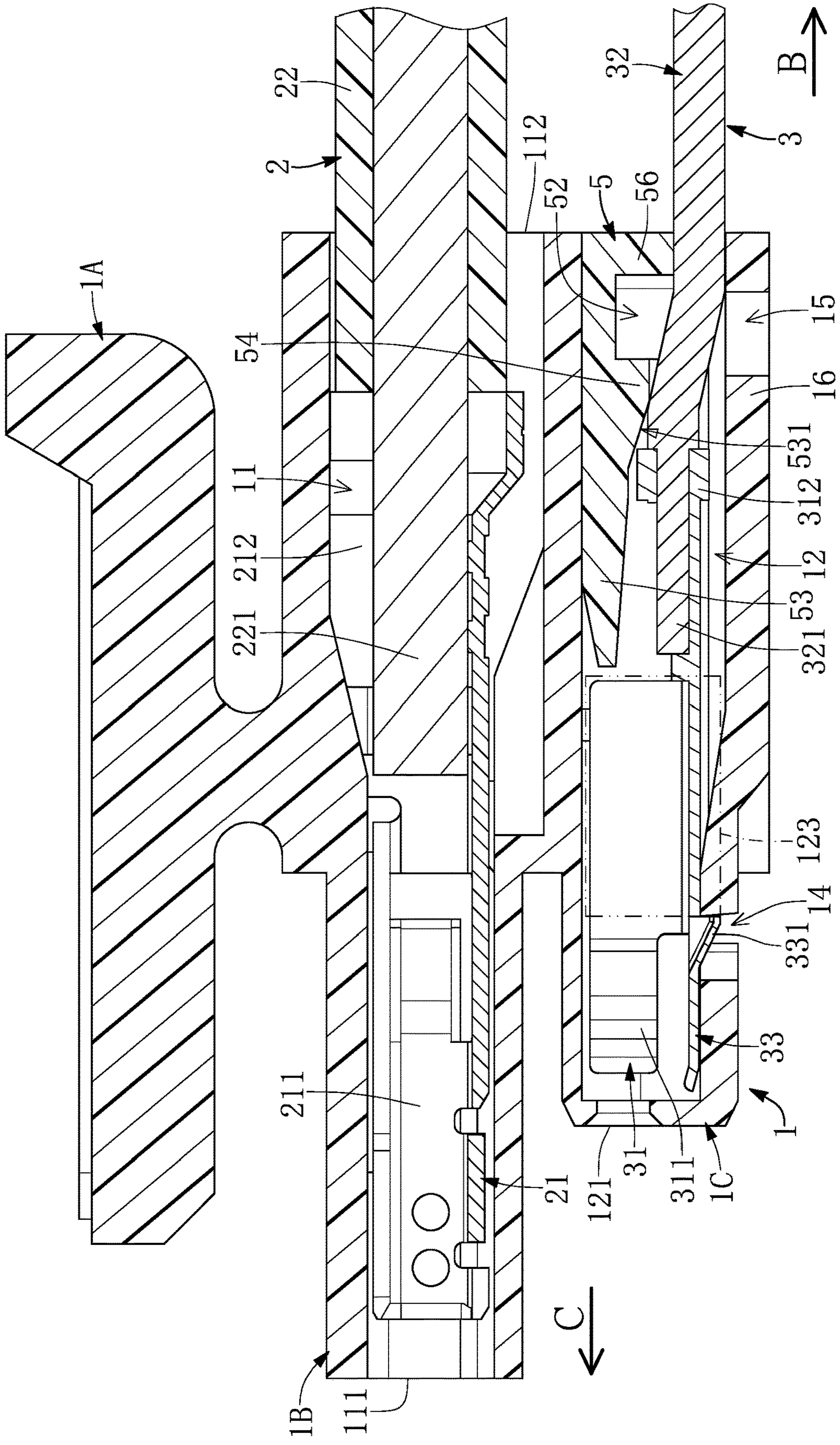
FIG. 8 is a schematic cross-sectional view showing the insulating body of the cable connector assembled with the first cable assembly, the second assembly, and the second stop structure.

Reference is made to FIG. 1 to FIG. 6, FIG. 1 and FIG. 2 are schematic views of a cable connector from different angles of view according to a first embodiment of the present disclosure, FIG. 3 is a partial schematic exploded view of the cable connector, FIG. 4 is a schematic cross-sectional view of an insulating body of the cable connector, FIG. 5 is a schematic view of a second cable assembly of the cable connector, and FIG. 6 is a schematic cross-sectional view of the insulating body of the cable connector assembled with a first cable assembly and the second cable. It should be noted that the schematic cross-sectional view in FIG. 6 takes the insulating body of FIG. 4, and further incorporates the first cable assembly and the second cable assembly that are arranged in the insulating body of FIG. 4. FIG. 8 is based upon FIG. 6, and further incorporates a second stop structure that is arranged in the insulating body of FIG. 6.

It should be noted that, when a quantity of any one component provided by the present embodiment is more than one, the following description just describes the structure of one of the components and the connection relationship between the one of the components and a corresponding component for the sake of brevity.

Figure 9:
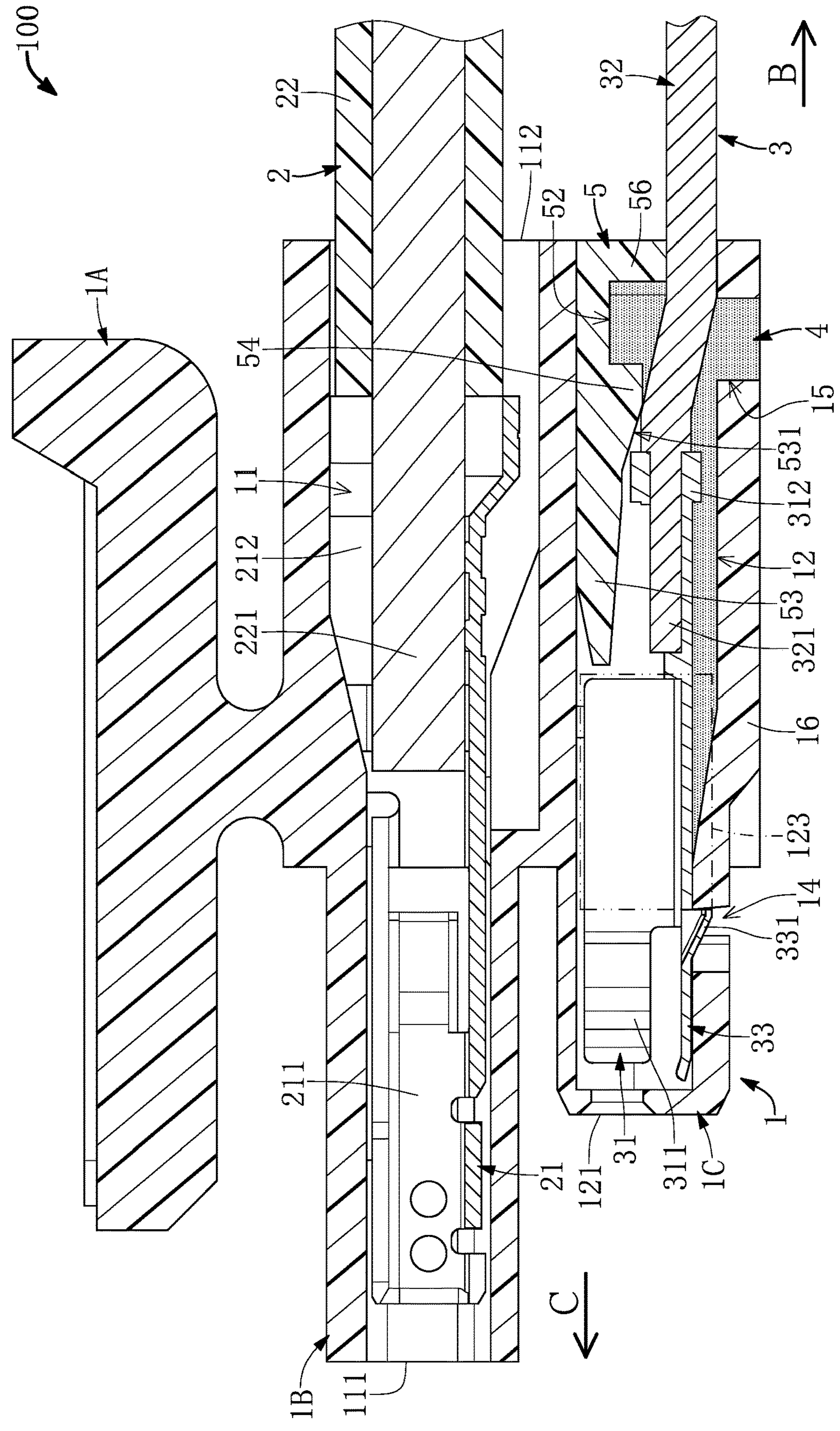
FIG. 9 is a schematic cross-sectional view taken along line IX-IX of FIG. 1.

The present disclosure provides a cable connector 100 including an insulating body 1, two first cable assemblies 2, six second cable assemblies 3, a first stop structure 4 (as shown in FIG. 9), and a second stop structure 5. In the cable connector 100, a quantity of the first cable assemblies 2, a quantity of the second cable assemblies 3, a quantity of the first stop structure 4, and a quantity of the second stop structure 5 are not limited by the drawings of the present embodiment. In one variant embodiment, the cable connector 100 can include one first cable assembly 2 and one second cable assembly 3. In one variant embodiment, the cable connector 100 can also include two first stop structures 4 and two second stop structures 5, one of the two first stop structures 4 and one of the two second stop structures 5 jointly limit a movable range of the first cable assembly 2 in the insulating body 1, and another one of the two first stop structures 4 and another one of the two second stop structures 5 jointly limit a movable range of the second cable assembly 3 in the insulating body 1.

The insulating body 1 includes a quick release structure 1A, two first terminal slots 11, and six second terminal slots 12. The quick release structure 1A can be an elastic arm, and a middle part of the quick release structure 1A is connected to a surface of the insulating body 1. When the cable connector 100 is inserted into a docking connector along with a docking direction C, one end of the quick release structure 1A (engaging end) is engaged with the docking connector. When the cable connector 100 is separated from the docking connector, a user can operate another end of the quick release structure 1A (action end) to allow the quick release structure 1A to be disengaged with the docking connector, so that the cable connector 100 can be separated from the docking connector. In the quick release structure 1A, a width of the engaging end of the elastic arm is less than a width of the action end of the elastic arm. In the insulating body 1, a quantity of the first terminal slots 11 and a quantity of the second terminal slots 12 preferably correspond to the quantity of the first cable assemblies 2 and the quantity of the second cable assemblies 3.

The insulating body 1 includes a plurality of column structures 1B arranged on a front and a top side thereof, and each of the column structures 1B includes one or more first terminal slots 11. Each of the first terminal slots 11 can approximately take the form of a rectangular channel. Two ends of each of the first terminal slots 11 respectively include a first connection opening 111 (that is arranged on a front end of the column structures 1B) and a first insertion opening 112 (that is arranged in a rear end of the insulating body 1). The insulating body 1 includes one or more elongated structures 1C arranged on a front end and a bottom side thereof, the column structures 1B are spaced apart from the elongated structure 1C, and a front end of the elongated structure 1C is arranged at a rear side of the front end of the column structures 1B. The elongated structure 1C includes one or more second terminal slots 12. Each of the second terminal slots 12 can approximately take the form of a rectangular channel, and two ends of the second terminal slot 12 respectively include a second connection opening 121 and a second insertion opening 122. An area of a cross section of each of the first terminal slots 11 perpendicular to the docking direction C is greater than an area of a cross section of each of the second terminal slots 12 perpendicular to the docking direction C. Moreover, specific shapes of the first terminal slot 11 and the second terminal slot 12 are not limited by the drawings, and can be changed according to the types and shapes of the first cable assembly 2 and the second cable assembly 3. Each of the first connection openings 111 and each of the second connection openings 121 are arranged on one end of the cable connector 100, and each of the first insertion openings 112 and each of the second insertion openings 122 are arranged on another one end of the cable connector 100. The first connection opening 111 and the second connection opening 121 can be arranged on two opposite ends or two adjacent ends, respectively, and the first insertion openings 112 and the second insertion opening 122 can be arranged on two opposite ends or two adjacent ends, respectively.

The two first terminal slots 11 can be arranged side by side, the six second terminal slots 12 can be arranged side by side, and the two first terminal slots 11 can be located at one side of the six second terminal slots 12 (e.g., the first terminal slot 11 can be located above the six second terminal slots 12). The two first terminal slots 11 and the six second terminal slots 12 can be in a matrix arrangement, but the present disclosure is not limited by the configuration shown in the figures.

As shown in the figures of the present embodiment, partial segments of the six second terminal slots 12 can be in spatial communication with each other. For example, the partial segments of all of the six second terminal slots 12 adjacent to the second insertion openings 122 are in spatial communication with each other to jointly define a single accommodating space A, but a quantity of the accommodating space A is not limited thereto. In one particular embodiment, the partial segments of some of the six second terminal slots 12 jointly define one accommodating space A, the partial segments of the others of the six second terminal slots 12 jointly define another single accommodating space A, and two of accommodating spaces A can be not in spatial communication with each other.

As shown in FIG. 3 to FIG. 6, each of the first cable assemblies 2 includes a first conductive component 21 and a first connection cable 22 that is electrically connected to the first conductive component 21. The first conductive component 21 is connected to an inner conductor 221 of the first connection cable 22. The first conductive component 21 is fixed in the first terminal slot 11, and is disposed adjacent to the first connection opening 111. The first conductive component 21 and the first connection opening 111 are jointly defined as an electrical insertion slot that allows a first conductive component of the docking connector (e.g., a columnar conductive structure not shown in the drawings) to be inserted therein. A part of the first connection cable 22 is arranged in the first terminal slot 11. The first conductive component 21 can enter into the first terminal slot 11 through the first insertion opening 112. When the first conductive component 21 is fixed in the first terminal slot 11, a partial segment of the first connection cable 22 is substantially located at the first insertion opening 112. At least part of each of the two first terminal slots 11 (including a part that receives the first conductive component 21) is provided to enable the two first terminal slots 11 to be not in spatial communication with each other or to be separated through an insulating material, such that the two first conductive components 21 respectively disposed in the two first terminal slots 11 are not in contact with each other. Another part of each of the two first terminal slots 11 (e.g., arranged adjacent to the first insertion opening 112) is provided to enable the two first terminal slots 11 to be in spatial communication with each other.

Each of the second cable assemblies 3 includes a second conductive component 31 and a second connection cable 32 that is electrically connected to the second conductive component 31. In the present embodiment, a size of the first conductive component 21 is greater than a size of the second conductive component 31. For example, an area or a width of a cross section of the second conductive component 31 perpendicular to the docking direction C is less than those of the first conductive component 21, and a width of the second conductive component 31 perpendicular to the docking direction C is less than a width of the first conductive component 21. The second conductive component 31 is connected to an inner conductor 321 of the second connection cable 32. The second conductive component 31 is fixed in the second terminal slot 12, and is disposed adjacent to the second connection opening 121. The second conductive component 31 and the second connection opening 121 are jointly defined as an electrical insertion slot to allow a second conductive component of the docking connector (e.g., a columnar conductive structure not shown in the drawings) to be inserted therein. A part of the second connection cable 32 is arranged in the second terminal slot 12. The second conductive component 31 of the second cable assembly 3 can enter into the second terminal slot 12 through the second insertion opening 122. When the second conductive component 31 is fixed in the second terminal slot 12, a partial segment of the second connection cable 32 is substantially located at the second insertion opening 122.

It is worth noting that, in one practical application, a quantity of conductive component and a quantity of connection cable included by any one of the first cable assembly and the second cable assembly can be adjusted according to design requirements (e.g., one-to-one, one-to-multiple, or multiple-to-one). For example, the first terminal slot 11 can include a plurality of first conductive components and a single first connection cable that is connected to the first conductive components, such that each of the first conductive components allows a current to travel uniformly therethrough; or, the first cable assembly can include a single first conductive component and a plurality of first connection cables that are connected to the first conductive component, such that the first conductive component allows a larger current to travel therethrough. For example, each of the first conductive components of each of the first cable assemblies can be connected to one or more than one first connection cables, and each of the second conductive components of each of the second cable assemblies can be connected to one or more than one second connection cables.

Moreover, segments of the second terminal slots 12 adjacent to the second insertion opening 122 can be in spatial communication with each other so as to jointly define an accommodating space A. Specifically, a specific size and a shape of the accommodating space A can be determined according to practical requirements (e.g., an overall size of the cable connector 100, a wire diameter of each of the second connection cables 32), and the present disclosure is not limited by the configuration shown in the figures. A part of each of the second connection cables 32 is arranged in the accommodating space A. The second conductive components 31 are respectively disposed in segments of the second terminal slots 12 that do not define the accommodating space A, and are not in contact with each other.

A type of the second conductive component 31 is different from a type of the first conductive component 21, that is to say, at least one of an appearance, a shape, a structure, and a size of the second conductive component 31 is different from that of the first conductive component 21. For example, the first cable assembly 2 and the second cable assembly 3 can be respectively configured to transmit electricity (power) and signals. Each of the first conductive components 21 can include a cylindrical structure 211 and a cable fixing structure 212. The cylindrical structure 211 is configured to contact the first conductive component of the docking connector, the cable fixing structure 212 is configured to fix the first connection cable 22, and the cable fixing structure 212 is connected to the inner conductor 221 of the first connection cable 22. Each of the second conductive components 31 can include two elastic arms 311 and a cable fixing structure 312. The two elastic arms 311 are configured to clamp the second conductive component of the docking connector (e.g., a columnar conductive structure not shown in the drawings), one end of each of the elastic arms 311 is connected to the cable fixing structure 312, the cable fixing structure 312 is configured to fix the second connection cable 32, and the cable fixing structure 312 is connected to an inner conductor 321 of the second connection cable 32. A quantity of the elastic arms 311 included in each of the second conductive components 31 can be increased or decreased according to practical requirements, and the present disclosure is not limited thereto.

In one of the embodiments, each of the second cable assemblies 3 can further include an engaged arm 33 that is connected to the second conductive component 31. In practical application, the second conductive component 31 and the engaged arm 33 of the second cable assembly 3 can be integrally formed as a single one-piece structure. The insulating body 1 further includes six engaged notches 14 that are respectively in spatial communication with each other, thereby allowing any one of the second terminal slots 12 to be in spatial communication with an external space through a corresponding one of the engaged notches 14. The engaged notch 14 is engaged with an engaged protrusion 331 of the engaged arm 33. The second conductive component 31 can be fixed in the second terminal slot 12 through the engaged arm 33, and the engaged protrusion 331 and the engaged notch 14 can be jointly configured to limit the movable range of the second cable assembly 3 from moving along an axial direction B (as shown in FIG. 8). Specifically, the second cable assembly 3 can't move at all along the axial direction B through the engaged protrusion 331 and the engaged notch 14. The engaged notch 14 is arranged adjacent to the second connection opening 121.

In one preferred embodiment, each of the engaged arms 33 can be an elastic arm, and each of the second terminal slots 12 can include a channel reduction segment 123 (as shown in FIG. 6). The channel reduction segment 123 is arranged between the engaged notch 14 and the second insertion opening 122, and the channel reduction segment 123 is arranged adjacent to the engaged notch 14. A height H of the second terminal slot 12 in the channel reduction segment 123 gradually decreases from one end of the second terminal slot 12 that is adjacent to the second insertion opening 122 to another end of the second terminal slot 12. When the second conductive components 31 is inserted into the second terminal slot 12 by passing through the second insertion opening 122, the protrusion 331 is pressed by a side wall of the channel reduction segment 123 when the engaged arm 33 is located in the channel reduction segment 123, such that the engaged arm 33 is elastically deformed to generate an elastic restoring force. After the engaged arm 33 passes through the channel reduction segment 123, the elastic restoring force is released to return the engaged arm 33 to an unstressed state, and the engaged protrusion 331 moves in a direction toward the engaged notch 14. Accordingly, the engaged protrusion 331 is engaged with the engaged notch 14.

The first stop structure 4 is made of a curable substance. Although the curable substance can provide a shielding effect between the connection cables by having conductivity, the curable substance is preferably an insulating curable substance that can be used to avoid an erroneous electrical connection between the conductive components. The first stop structure 4 is fixed in a part of the second terminal slot 12 that is arranged adjacent to the second insertion opening 122 so as to limit a movable range of the second cable assembly 3 in the second terminal slot 12. In one variant embodiment, the first stop structure 4 can be fixed in a part of the first terminal slot 11 that is arranged adjacent to the first insertion opening 112 so as to limit a movable range of the first cable assembly 2 in the first terminal slot 11. In one variant embodiment, the cable connector 100 can include two first stop structures 4 respectively fixed in the first terminal slot 11 and the second terminal slot 12, thereby respectively limiting a movable range of the first cable assembly 2 in the first terminal slot 11 and a movable range of the second cable assembly 3 in the second terminal slot 12.

The insulating body 1 also includes an injection hole 15 being in spatial communication with the accommodating space A. The injection hole 15 is configured to provide an uncured insulating curable substance to be arranged in the accommodating space A. For example, in the manufacturing process of the cable connector 100, the curable substance in a liquid phase or a gas phase can be injected into the accommodating space A through the injection hole 15, and then the curable substance in the liquid phase or the gas phase can be solidified through relevant solidification manners (e.g., an irradiating manner by using light of a specific wavelength, a colloid baking manner, or a solvent volatilizing manner) to form the first stop structure 4. In the present embodiment, the injection hole 15 is arranged on a bottom 16 of the cable connector 100, but the position of the injection hole 15 is not limited by the arrangement shown in the figures. In one variant embodiment, the injection hole 15 may be arranged on a left side or a right side of the cable connector 100.

In one preferred embodiment, the uncured insulating curable substance (e.g., the curable substance) can be injected into the accommodating space A through the first insertion opening 112 and the second insertion opening 122 of the insulating body 1, and then the curable substance can be solidified through the relevant solidification manners to form the first stop structure 4. An amount of the uncured insulating curable substance (e.g., the curable substance) injected into the accommodating space A is not limited to a specific value, but needs to enable the first connection cable 22 or the second connection cable 32 to be connected to the insulating body 1 for preventing the first connection cable 22 or the second connection cable 32 from being detached from the insulating body 1.

In one preferred embodiment, the insulating body 1 can include six limiting slots 13 respectively corresponding in position to the six second terminal slots 12. A quantity of the limiting slots 13 is equal to a quantity of the second connection cables 32. Each of the limiting slots 13 is configured to accommodate one of the second connection cables 32. The six limiting slots 13 are arranged adjacent to the second insertion opening 122, and a partial segment of each of the limiting slots 13 is arranged in the accommodating space A. When each of the second cable assemblies 3 is disposed in the insulating body 1, a segment of each of the second connection cables 32 adjacent to the second insertion opening 122 is arranged in a corresponding one of the limiting slots 13. Through a design of the limiting slots 13, the second connection cables 32 can be arranged neatly side by side, thereby preventing the second connection cables 32 from being stacked with each other and preventing the second connection cables 32 from being moved in the insulating body 1 when the curable substance is injected into the accommodating space A through the injection hole 15 or the second insertion opening 122.

As shown in FIG. 3, FIG. 4, FIG. 7, and FIG. 8, FIG. 7 is a schematic view of a second stop structure of the cable connector according to the present disclosure, and FIG. 8 is a schematic cross-sectional view showing the insulating body of the cable connector assembled with the first cable assembly, the second assembly, and the second stop structure according to the present disclosure.

The second stop structure 5 is prepared (or provided) in a solid state before being assembled to the second terminal slot 12, and then the second stop structure 5 is fixed in the second terminal slot 12. The second stop structure 5 is mainly configured to be filled in a part of the accommodating space A that is not occupied by the second cable assembly 3, thereby limiting a movable range of the second cable assembly 3 in the insulating body 1. Accordingly, a shape and a size of the second stop structure 5 can be designed according to a shape and a size of the accommodating space A, but the present disclosure is not limited thereto.

In a practical application, the second stop structure 5 can include two second engaging structures 51. The two second engaging structures 51 are configured to be respectively fixed with two first engaging structures 18 of the insulating body 1, so that the second stop structure 5 is fixed to a part of the second terminal slot 12 adjacent to the second insertion opening 122. In the present embodiment, each of the second engaging structures 51 is a protrusion structure, and each of the first engaging structures 18 is a perforation, but the present disclosure is not limited thereto. In one variant embodiment, the first engaging structure 18 and the second engaging structure 51 can be the protrusion structure and the perforation, respectively. Moreover, a quantity and an arrangement of the second engaging structures 51 included by the second stop structure 5 are not limited by the figures.

In the manufacturing process of the cable connector 100, relevant personnel or equipment can be used to sequentially place the six second cable assemblies 3 and the second stop structure 5 into the insulating body 1 through the second insertion opening 122, and then the curable structure is injected into the insulating body 1 through the injection hole 15 or the second insertion opening 122. Lastly, the curable substance can be solidified to become the first stop structure 4. Accordingly, when the second cable assemblies 3 are pulled by an external force, the second cable assemblies 3 are difficult to be separated from the insulating body 1.

In one of the variant embodiments, the second stop structure 5 can include a container 52. When the second stop structure 5 is disposed in the insulating body 1, the container 52 is in spatial communication with the injection hole 15. In the manufacturing process of the cable connector 100, the curable substance (e.g., liquid colloid, or gaseous colloid) is injected into the accommodating space A through the injection hole 15 can be further injected into the accommodating space A and the container 52, and then the curable substance is solidified to become the first stop structure 4, such that a part of the first stop structure 4 is formed in the container 52 and is connected to the container 52 of the second stop structure 5. Accordingly, a combination of the first stop structure 4 and the second stop structure 5 can be substantially filled in an entirety of the accommodating space A, so that the second stop structure 5 is more difficult to be separated from the second terminal slot 12, and the second cable assembly 3 is not easily moved relative to the insulating body 1.

In one of specific embodiments, the second stop structure 5 includes a front end portion 53, a first retaining wall 54, a connection portion 55, a second retaining wall 56, and two elastic arms 57. One end of the front end portion 53 is connected to the first retaining wall 54, and another one end of the front end portion 53 is an end of the second stop structure 5. Two ends of the connection portion 55 are respectively connected to the first retaining wall 54 and the second retaining wall 56. The first retaining wall 54, the connection portion 55, and the second retaining wall 56 jointly define the container 52. The two elastic arms 57 outwardly extend from two opposite sides of the second retaining wall 56, respectively, the two second engaging structures 51 are respectively arranged on ends of the two elastic arms 57.

When the second stop structure 5 is fixed in the second terminal slot 12, the front end portion 53 can be located above the second conductive component 31, the first retaining wall 54 and the second retaining wall 56 are substantially located in the accommodating space A, and the container 52 faces toward the second connection cable 32.

In one preferred embodiment, one end of the front end portion 53 is arranged adjacent to the first retaining wall 54 includes a limit slanting surface 531. The limit slanting surface 531 is configured to abut against the cable fixing structure 312, thereby limiting (or preventing) the second conductive component 32 from leaving the second terminal slot 12 along an axial direction B.

In one of the present embodiments, the first retaining wall 54 and the second retaining wall 56 can respectively include a plurality of first auxiliary limiting grooves 541 and a plurality of second auxiliary limiting grooves 561 that respectively correspond in position to the first auxiliary limiting grooves 541. Each of the first auxiliary limiting grooves 541 and a corresponding one of the second auxiliary limiting grooves 561 are configured to accommodate one of the second connection cables 32. When the second stop structure 5 is fixed in the second terminal slot 12, each of the first auxiliary limiting grooves 541 is disposed to face a partial segment of one of the limiting slots 13 of the insulating body 1, and each of the second auxiliary limiting grooves 561 is disposed to face a partial segment of one of the limiting slots 13 of the insulating body 1. Each of the first auxiliary limiting grooves 541 and the partial segment of the corresponding one of the limiting slots 13 can jointly hold a partial segment of the second connection cable 32, and each of the second auxiliary limiting grooves 561 and the partial segment of the corresponding one of the limiting slots 13 can jointly hold a partial segment of the second connection cable 32. The first auxiliary limiting grooves 541 and the second auxiliary limiting grooves 561 are designed to effectively limit the movable range of the second connection cables 32 in the accommodating space A.

In one of the present embodiments, a height of the first retaining wall 54 can be less than a height of the second retaining wall 56. When the second stop structure 5 is fixed in the second terminal slot 12, the first retaining wall 54 and the second retaining wall 56 can abut against different segments of the second connection cable 32, and a segment of the second connection cable 32 is arranged adjacent to the first retaining wall 54 and the second retaining wall 56 can be deformed in a curved mode by being pressed from the first retaining wall 54 and the second retaining wall 56. Accordingly, the second connection cable 32 can be applied with a force from the second stop structure 5, so that the second stop structure 5 can provide a position limitation to the second connection cable 32. That is to say, a part of the second connection cable 32 in the second terminal slot 12 includes a bend segment. The bend segment is configured to transfer the external force to the second stop structure 5 when the second cable assembly 3 receives the external force, thereby reducing a probability that the second cable assembly 3 is separated from the second terminal slot 12 by the external force. Moreover, the first retaining wall 54 and the second retaining wall 56 can be designed to limit a space that is filled with the curable substance, thereby preventing the curable substance from overflowing from the accommodating space A to affect an operation of the cable connector 100 (e.g., the curable substance overflows to the elastic arm 311 of the second conductive component 31 to affect a movement of the elastic arm 311) or an appearance of the cable connector 100 (e.g., the curable substance overflows to an outside of the cable connector 100).

In one of the variant embodiments, the second terminal slot 12 of the cable connector 100 can be provided with the second stop structure 5 fixed therein and can be provided without the first stop structure 4 therein (e.g., the second terminal slot 12 does not need to be injected with the curable substances). The second stop structure 5 is engaged with and fixed in the insulating body 1, and the front end portion 53, the first retaining wall 54, and/or the second retaining wall 56 can be designed to limit a movable range of the second cable assembly 3 in the insulating body 1, so that the second cable assembly 3 is not easily detached from the insulating body 1.

Figure 10:
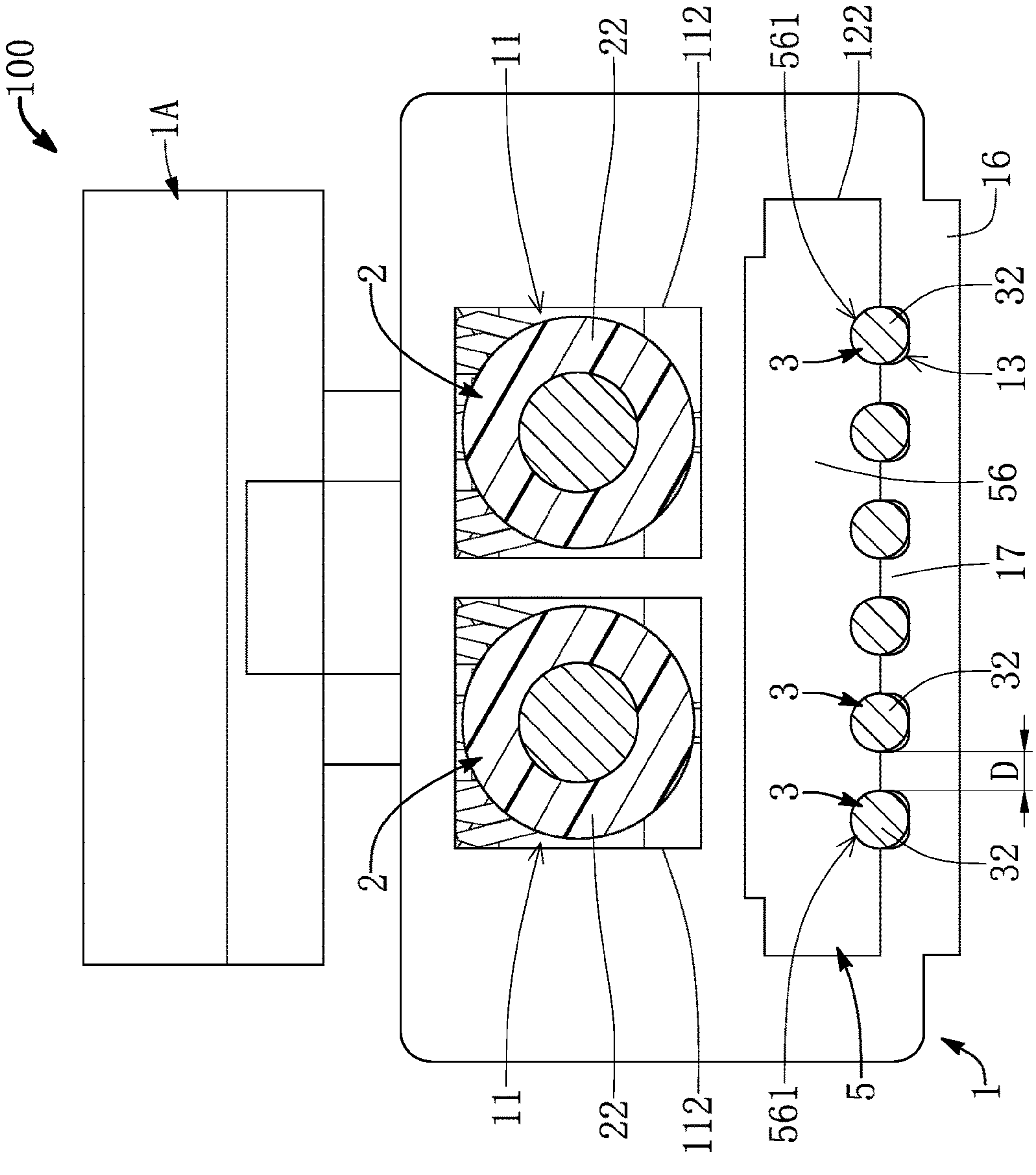
FIG. 10 is a schematic rear view of the cable connector.

FIG. 9 and FIG. 10 are respectively a schematic cross-sectional view and a schematic rear view of the cable connector according to the present disclosure. In one of the preferred embodiments, A width D of a retaining wall 17 between two of the limiting slots 13 adjacent to each other is greater than or equal to 0.5 mm (e.g., a gap width between two of the second connection cables 32 adjacent to each other is greater than or equal to 0.5 mm). Accordingly, it can be ensured that the curable substance is injected and flows into a space between any two of the second connection cables 32 adjacent to each other, thereby ensuring that the first stop structure 4 solidified and formed in the accommodation space A can be provided to effectively fix the second connection cables 32 together.

Figure 11:
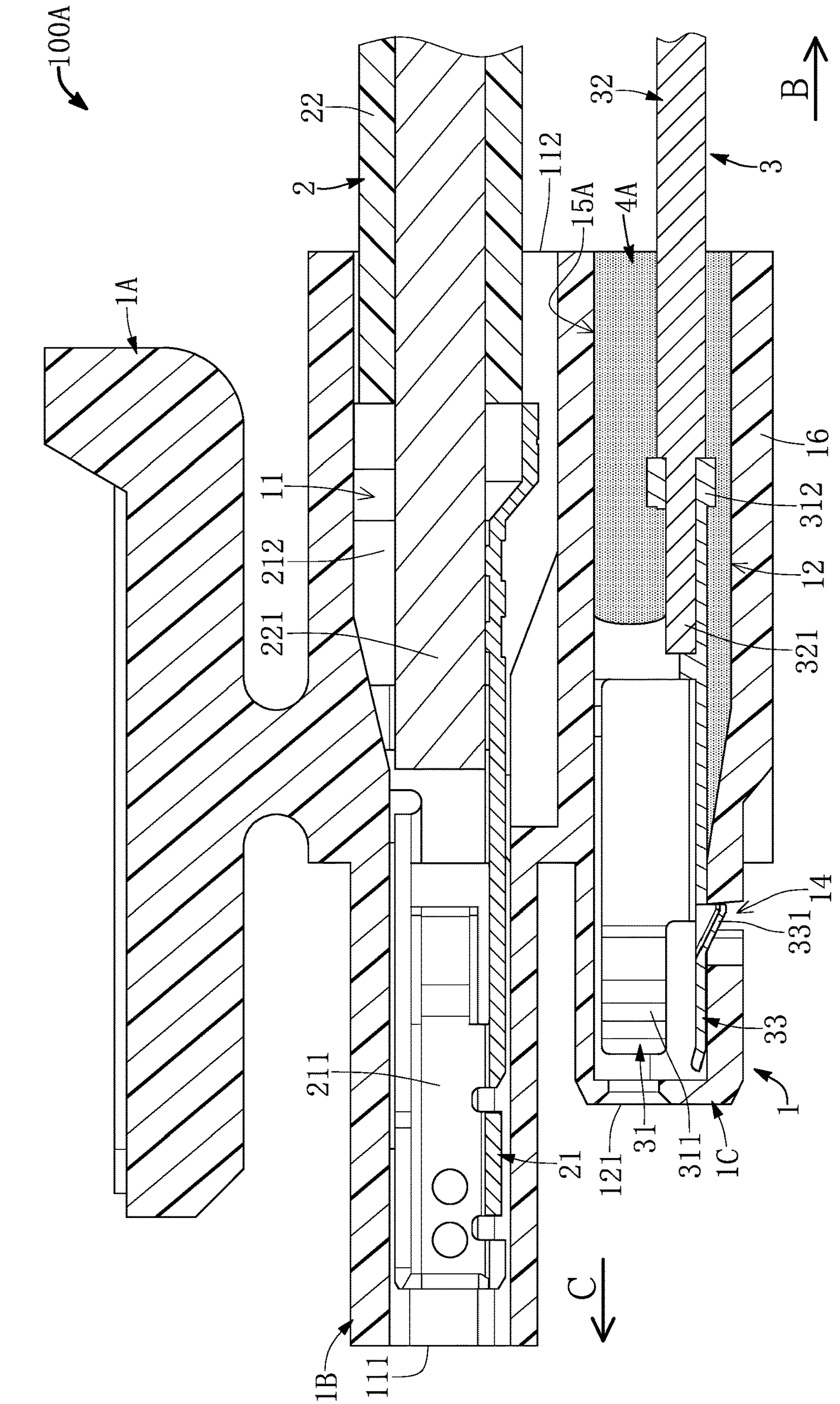
FIG. 11 is a schematic cross-sectional view of the cable connector according to a second embodiment of the present disclosure.

As shown in FIG. 9 and FIG. 11, FIG. 11 is a schematic cross-sectional view of the cable connector according to a second embodiment of the present disclosure. A difference between a cable connector 100A shown in FIG. 11 and the cable connector 100 shown in FIG. 9 is described as follows. The cable connector 100A of the present embodiment does not include the second stop structure 5 (as shown in FIG. 9). A part of the first stop structure 4 of the cable connector 100A in the present embodiment is located between each of the second cable assemblies 3 and the bottom 16 of the insulating body 1, and another part of the first stop structure 4 is located above each of the second connection cables 32.

As shown in FIG. 4, in the aforementioned embodiments, the second insertion openings 122 of the second terminal slots 12 are in spatial communication with each other so as to jointly define a single opening. The injection hole 15 is arranged on the bottom 16 of the insulating body 1. As shown in FIG. 11, the second insertion openings of the cable connector 100A in the present embodiment are in spatial communication with each other and are defined as an injection hole 15A, and the bottom 16 of the insulating body 1 can be provided without a perforation for injection of glue.

In other words, in the manufacturing process of the cable connector 100A, after the second cable assemblies 3 are disposed in the insulating body 1 by relevant personnel or equipment, the curable substance can be injected through a rear end opening of the insulating body 1 (e.g., a part of the insulating body that allows the second connection cable 32 to pass therethrough) until the curable substance completely or almost completely covers parts of each of the second connection cables 32 located in the accommodating space A (and is preferably in contact with at least part of an inner surface of the insulating body 1 in the accommodating space A). In practice, since a gap between the cable fixing structure 312 and the second terminal slot 12 is quite small at the front end of the second terminal slot 12 (that is used for docking), the curable substance is not easily injected into the gap for preventing the curable substance from affecting the docking process. After the curable substance is solidified to become a first stop structure 4A in relevant solidification manner, the manufacturing of the cable connector 100A in present embodiment can be completed.

It should be particularly emphasized that in any variation of any one of the above embodiments, the first terminal slot 11 of the cable connector 100 can include the aforementioned accommodating space, and the accommodating space of the first terminal slot 11 can be provided with at least one of the aforementioned first stop structure 4 and the aforementioned second stop structure 5.

Beneficial Effects of the Embodiments

In conclusion, the cable connector in the present disclosure can be provided to effectively limit the movable range of the second cable assembly (and/or the first cable assembly) in the insulating body through the stop structure, thereby effectively reducing issues relating to the second cable assembly (and/or the first cable assembly) being easily detached from the insulating body when being applied with the external force. In the cable connector provided by one of the embodiments in the present disclosure, one of the first stop structure and second stop structure or the cooperation between the second stop structure and the first stop structure can be provided to further limit the movable range of the second cable assembly (and/or the first cable assembly) in the insulating body, so that the second cable assembly is more difficult to be detached from the insulating body.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cable connector, comprising:

an insulating body including:

at least one first terminal slot; and a plurality of second terminal slots, wherein one end of the second terminal slots jointly defines an accommodating space;

at least one first cable assembly including a first conductive component and a first connection cable, wherein the first conductive component is electrically connected to the first connection cable, and the first conductive component is fixed to the at least one first terminal slot;

at least one second cable assembly including a second conductive component and a second connection cable, wherein the second conductive component is electrically connected to the second connection cable, the second conductive component is fixed to one of the second terminal slots, and a part of the second connection cable is arranged in the accommodating space; and wherein the at least one second cable assembly is different from the first cable assembly; and a first stop structure made of a curable substance, wherein the first stop structure is fixed in the accommodating space to limit a movable range of the second cable assembly in a corresponding one of the second terminal slots.

2. The cable connector according to claim 1, wherein a size of the first conductive component is greater than a size of the second conductive component.

3. The cable connector according to claim 2, wherein the first cable assembly is configured to transmit electricity, and the second cable assembly is configured to transmit signals.

4. The cable connector according to claim 1, wherein the first stop structure is formed by solidifying the curable substance that is arranged in the accommodating space.

5. The cable connector according to claim 4, wherein the insulating body has an injection hole, and wherein the injection hole is in spatial communication with the accommodating space, and the curable substance is injected into the accommodation space through the injection hole.

6. The cable connector according to claim 1, wherein the accommodating space has a plurality of limiting slots, the limiting slots respectively correspond in position to the second terminal slots, and at least one of the limiting slots are configured to accommodate the second connection cable.

7. The cable connector according to claim 6, wherein a width of a retaining wall between two of the limiting slots adjacent to each other or a gap between two of the second connection cables adjacent to each other is greater than or equal to 0.5 mm.

8. The cable connector according to claim 1, further comprising a second stop structure, wherein the insulating body has at least one first engaging structure, the second stop structure has at least one second engaging structure, and the second engaging structure is configured to be engaged with the first engaging structure to fix the second stop structure to the insulating body.

9. The cable connector according to claim 8, wherein the second stop structure includes a container that is in spatial communication with the accommodating space, and the first stop structure is formed by solidifying the curable substance that is arranged in the accommodating space and the container.

10. The cable connector according to claim 1, wherein a front end portion of the insulating body includes at least one columnar structure and at least one elongated structure that is spaced apart from the at least one columnar structure, and wherein the at least one first terminal slot is formed on the at least one columnar structure, and the second terminal slots are formed on the at least one elongated structure.

11. A cable connector, comprising:

an insulating body including:

at least one first terminal slot, wherein two ends of the at least one first terminal slot have a first connection opening and a first insertion opening, respectively;

at least one second terminal slot, wherein two ends of the at least one second terminal slot have a second connection opening and a second insertion opening, respectively; and at least one first engaging structure is arranged adjacent to the at least one second terminal slot;

at least one first cable assembly including a first conductive component and a first connection cable, wherein the first conductive component is electrically connected to the first connection cable, the first conductive component is fixed in the at least one first terminal slot and is arranged adjacent to the first connection opening, and a part of the first connection cable is arranged in the at least one first terminal slot;

at least one second cable assembly including a second conductive component and a second connection cable, wherein the second conductive component is electrically connected to the second connection cable, the second conductive component is fixed in the at least one second terminal slot and is arranged adjacent to the second connection opening, a part of the second connection cable is arranged in the at least one second terminal slot, and the second conductive component is different from the first conductive component; and a second stop structure being an insulating structure, wherein the second stop structure includes a second engaging structure, and wherein the second engaging structure is configured to be engaged with the first engaging structure, so that the second stop structure is fixed and arranged adjacent to the second insertion opening.

12. The cable connector according to claim 11, further comprising a first stop structure made of an insulating curable substance, wherein the first stop structure is fixed to and arranged in a part of the at least one second terminal slot adjacent to the second insertion opening to limit a movable range of the second cable assembly in the at least one second terminal slot.

13. The cable connector according to claim 11, wherein the part of the second connection cable arranged in the at least one second terminal slot includes a bend segment.

14. The cable connector according to claim 11, wherein at least one of the first conductive component and the second conductive component includes a cylindrical structure, the at least one first cable assembly is configured to transmit electricity, and the at least one second cable assembly is configured to transmit signals.

15. The cable connector according to claim 12, wherein the part of the at least one second terminal slot arranged adjacent to the second insertion opening has an accommodating space, and the part of the second connection cable of the at least one second cable assembly is arranged in the accommodating space, wherein the insulating body includes an injection hole that is in spatial communication with the accommodating space, a part of the second stop structure is arranged in the accommodating space, and the second stop structure has a container that is in spatial communication with the accommodating space, and wherein the injection hole is configured to provide a curable substance to be arranged in the accommodating space and the container, and the first stop structure is formed by solidifying the curable substance.

16. The cable connector according to claim 15, wherein the insulating body has at least one limiting slot corresponding in position to the at least one second terminal slot, the at least one limiting slot is configured to accommodate the second connection cable, the at least one limiting slot is arranged adjacent to the second insertion opening, and a part of the at least one limiting slot is arranged in the accommodating space.

17. The cable connector according to claim 16, wherein a quantity of the at least one limiting slot is more than one, and a retaining wall between two of the limiting slots adjacent to each other has a width that is greater than equal to 0.5 mm.

18. The cable connector according to claim 15, wherein the second stop structure includes a first retaining wall, a connection portion, a second retaining wall, and two elastic arms, wherein two ends of the connection portion are respectively connected to the first retaining wall and the second retaining wall, and the first retaining wall, the connection portion, and the second retaining wall jointly define the container, and wherein the two elastic arms extend outwardly from two ends of the second retaining wall, respectively, and the second engaging structure is arranged on at least one of the ends of the two elastic arms.

19. The cable connector according to claim 18, wherein the first retaining wall includes a plurality of first auxiliary limiting grooves, and the second retaining wall include a plurality of second auxiliary limiting grooves respectively corresponding in position to the second auxiliary limiting grooves, and wherein each of the first auxiliary limiting grooves and a corresponding one of the second limiting grooves are configured to accommodate the second connection cable, and a height of the first retaining wall is less than a height of the second retaining wall.

20. The cable connector according to claim 18, wherein the second conductive component includes at least two elastic arms and a cable fixing structure, an end of each of the at least two elastic arms is connected to the cable fixing structure, and the cable fixing structure is connected to an inner conductor of the second connection cable, wherein the second stop structure includes a front end portion, the front end portion is arranged adjacent to an end of the first retaining wall includes a limit slanting surface, and wherein the limit slanting surface is configured to abut against the cable fixing structure so as to limit the second conductive component from leaving the at least one second terminal slot along an axial direction.

21. The cable connector according to claim 11, wherein the at least one second cable assembly includes an engaged arm, and the second conductive component is connected to the engaged arm, wherein the insulating body includes at least one engaged notch configured to be engaged with the engaged arm, and wherein the second conductive component is fixed in the at least one second terminal slot through the engaged arm.

* * * * *